United States Patent [19]

Morishita et al.

[11] Patent Number: 4,776,225
[45] Date of Patent: Oct. 11, 1988

[54] PLANET GEAR TYPE SPEED REDUCTION STARTER

[75] Inventors: Akira Morishita; Hiroaki Aso, both of Hyogo, Japan

[73] Assignee: Mitsubishi Denki Kabushiki Kaisha, Tokyo, Japan

[21] Appl. No.: 16,593

[22] Filed: Feb. 19, 1987

[30] Foreign Application Priority Data

Feb. 24, 1986 [JP] Japan .................. 61-27262[U]

[51] Int. Cl.⁴ ................... F02N 15/06; F16H 1/32
[52] U.S. Cl. .................................. 74/7 E; 74/801; 310/83
[58] Field of Search ........... 74/7 R, 7 A, 7 E, 801, 74/785; 310/83

[56] References Cited

U.S. PATENT DOCUMENTS

| | | | |
|---|---|---|---|
| 4,494,414 | 1/1985 | Hamano | 74/801 X |
| 4,590,811 | 5/1986 | Kasubuchi | 74/7 A X |
| 4,597,453 | 7/1986 | Kilmer et al. | 74/801 X |
| 4,635,489 | 1/1987 | Imamura et al. | 74/7 E |
| 4,651,575 | 3/1987 | Morishita et al. | 74/7 E |
| 4,680,979 | 7/1987 | Morishita et al. | 74/7 E |

FOREIGN PATENT DOCUMENTS

| | | | |
|---|---|---|---|
| 901960 | 7/1962 | United Kingdom | 74/785 |
| 2108627 | 5/1983 | United Kingdom . | |

Primary Examiner—Allan D. Herrmann
Attorney, Agent, or Firm—Sughrue, Mion, Zinn, Macpeak & Seas

[57] ABSTRACT

A planetary gear system for the speed reduction output of a starter motor. The internal gear is made of an elastic resin and is separated from the casing of the system or a metal ring fitted in the casing by a predetermined gap. Thereby, the internal ring can deform over a range of shocks but is prevented from deforming by the casing or metal ring above this shock range.

8 Claims, 1 Drawing Sheet

PLANET GEAR TYPE SPEED REDUCTION STARTER

BACKGROUND OF THE INVENTION

1. Field of the Invention

This invention relates to internal speed reduction type starters, and more particularly to planet gear type speed reduction starters comprising planet gear speed reduction means.

2. Background of the Invention

One example of the conventional planet gear type speed reduction starter is as shown in the half section view of FIG. 1. At the end face of a yoke 2 of a DC motor 1, an internal gear 3 of resin forms a planet gear speed reduction means. The internal gear 3 and an intermediate bracket 4 together with a rubber ring 5 are fitted on an inner lower side 7 of a front bracket 6. Further in FIG. 1 is shown an armature 8 of the DC motor 1. An armature rotary shaft 9 has a spur gear 10 at its front end portion which is engaged with a planet gear 11. A bearing 12 is coaxially inserted into the planet gear 11 and is mounted on a supporting pin 13. A flange 14 fixedly secures the supporting pin 13, the flange 14 forming an arm of the planet gear speed reduction means and being integral with an rotary output shaft 15. A sleeve bearing 16 is fitted into the central cylindrical hole of the intermediate bracket 4, the bearing 16 supporting the rotary output shaft 15. A sleeve bearing 17 is fitted into the central cylindrical recess 18 of the rotary output shaft 15, the sleeve bearing 17 supporting the front end portion of the armature rotary shaft 9. Further in FIG. 1, a steel ball bearing 19 is set between the armature rotary shaft 9 and the rotary output shaft 15 and transmits thrust load between these rotary shafts 9 and 15. A thrust washer 20 is placed between the armature rotary shaft 9 and the rotary output shaft 15. Helical splines 21 are formed on the rotary output shaft 15 so that an unillustrated over-running clutch (including a pinion) is slidably engaged with the helical splines 21.

The operation of the conventional planet gear type speed reduction starter thus constructed will be described. The armature 8 produces torque transverse to the drawing when energized, and the torque thus produced is transmitted to the armature rotary shaft 9 and through the spur gear 10, the planet gear 11 and the supporting pin 13 to the flange 14. That is, the speed of rotation of the armature 8, being reduced by this planet gear speed reduction mechanism, is transmitted to the rotary output shaft 15.

In the conventional planet gear type speed reduction starter thus constructed, the internal gear 3 is made of resin (Nylon). Therefore, when a shock occurs at the starting of the engine, the internal gear 3 tends to flex to absorb the shock. However, the internal gear 3 is fitted in the front bracket 6 with a small gap in the radial direction. Therefore, when a shock caused by the ordinary variation in torque of the engine is applied to the internal gear 3, the amount of flexure of the internal gear 3 is so small that the internal gear 3 cannot absorb the shock.

Another example of the conventional planet gear type speed reduction starter in which the gap between the internal gear 3 and the front bracket 6 is excessively large in the radial direction suffers from the following difficulties. That is, when at the starting of the engine, the engine stops abruptly or the pinion of the starter is not satisfactorily engaged with the engine ring gear, a large shock is given to the internal gear 3. However, in this case, the internal gear 3 is deformed excessively in the radial direction so that the internal gear 3 may be broken.

A similar type device is disclosed in U.K. Pat. No. 2,109,893B which corresponds to U.S. application Ser. No. 435,190 filed on Oct. 19, 1982 and issued as U.S. Pat. No. 4,494,414. In the device, an internal gear is held by a resilient member in the radial direction so that impacting force applied to the internal gear is absorbed by the resilient member. Further, U.K. Pat. No. 2,108,627B discloses an internal gear held by a resilient member in its axial direction. Even if rotational force is applied to the internal gear, its rotation can be eliminated. Even if impacting force exceeding a predetermined level is applied to the gear the force is absorbed by the resilient member. In these two patents, the internal gear is held elastically to absorb impact applied to the gear. However, these patents do not disclose the internal gear having its own resiliency to provide its resilient deformation.

SUMMARY OF THE INVENTION

Accordingly, an object of this invention is to eliminate the above-described difficulties accompanying a conventional planet gear type speed reduction starter.

More particularly, an object of the invention is to provide a planet gear type speed reduction starter in which, when an ordinary shock occurs, the internal gear is effectively flexed to absorb the shock and when a shock greater than the ordinary shock occurs, the excessive deformation of the internal gear is prevented so that the internal gear is protected from damage.

In the planet gear type speed reduction starter of the invention, the internal gear of resin is arranged inside the casing or a metal ring fitted in the casing with a predetermined gap between the internal gear and the casing or the metal ring in the radial direction, to absorb a shock in a predetermined range.

When the ordinary shock is applied to the internal gear, the internal gear is effectively flexed in the gap to absorb the shock. When a shock greater than ordinary is given to the internal gear, the excessive deformation of the internal gear is prevented by the cylindrical inner surface of the metal ring or the casing.

BRIEF DESCRIPTION OF THE DRAWINGS

In these figures, like parts are designated by like reference numerals of characters.

DETAILED DESCRIPTION OF THE PREFERRED EMBODIMENTS

Figure 1:
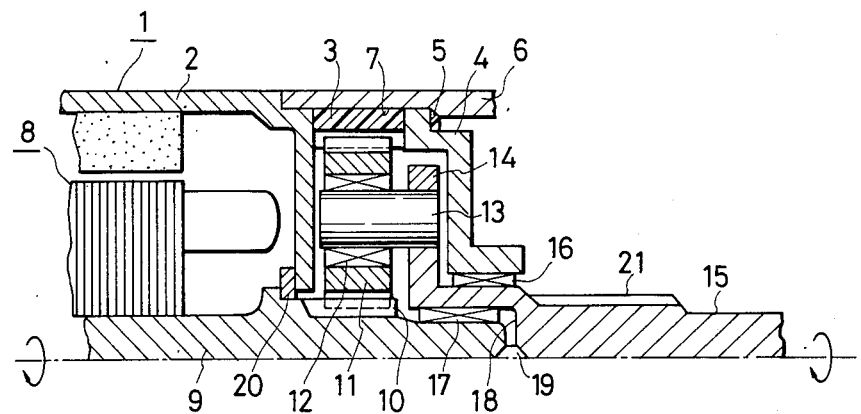
FIG. 1 is a sectional view showing one example of a conventional planet gear type speed reduction starter.
Figure 2:
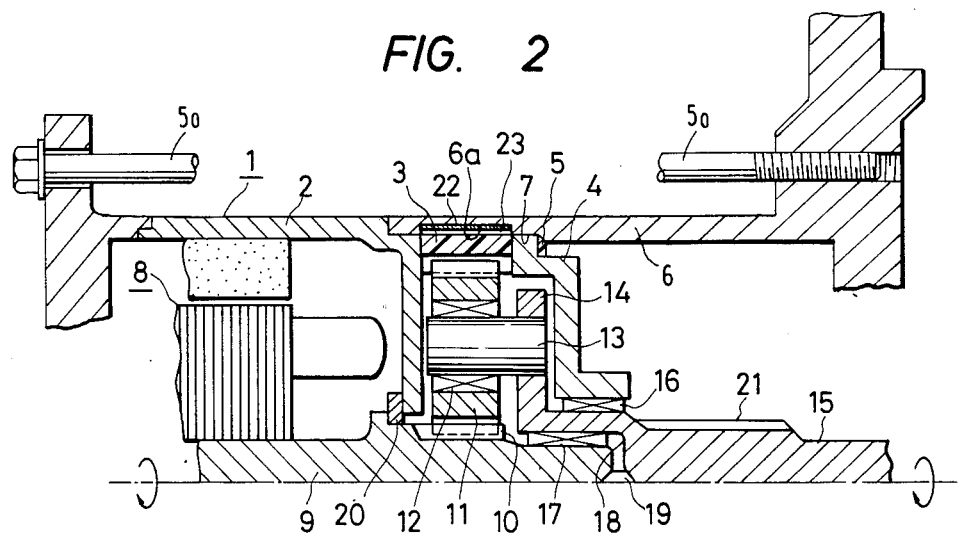
FIG. 2 is a sectional view showing one example of a planet gear type speed reduction starter of this invention.

One embodiment of this invention will be described with reference to FIG. 2 in which those components which have been previously described with reference to FIG. 1 are therefore similarly numbered.

In FIG. 1 an annular groove 6a is formed in the cylindrical inner surface of the front bracket 6. An iron ring 22 is fitted in the annular groove 6a in such a manner that the ring 22 confronts with the cylindrical outer wall of the elastic internal gear 3 through a gap 23 in the radial direction, i.e., the ring 23 is loose-fitted on the internal gear 3.

In the embodiment thus constructed, the iron ring 22 is press-fitted into the annular groove 6a of the front bracket 6 or it is fitted into the annular groove 6a by other suitable methods. The internal gear 3, the intermediate bracket 4 and the rubber ring 5 are fixed to one another with long bolts 5a in such a manner that they are held between the front bracket 6 and the yoke 2. In this case, the gap 23 is provided between the internal gear 3 and the iron ring 22 as shown in FIG. 2. When, under this condition, an ordinary shock is applied to the internal gear 3, the internal gear 3 absorbs the shock while flexing itself in the gap 23. If a shock greater than the ordinary shock is given to the internal gear 3, according to the flexibility of the internal gear 3, it flexes itself radially to absorb the shock. The maximum amount of flexure of the internal gear 3 is determined by the size of the gap 23 in the radial direction. Flexure of the internal gear more than that is limited by the iron ring 22. Accordingly, the gap 23 is so determined that the internal gear 3 can absorb a great shock applied to the starter and is free from the great deformation which may breaks the internal gear.

In the above-described embodiment, the gap 23 is provided outside the cylindrical outer wall of the internal gear 3, and the iron ring 22 is employed to prevent the internal gear 3 from excessive deformation. However, this method may be replaced by a method in which the ring 22 is not used. Instead the predetermined gap in the radial direction is formed between the internal gear 3 and a casing such as the front bracket 6 so that the excessive deformation of the internal gear 3 is prevented by utilizing the cylindrical inner surface of the casing. In the above-described embodiment, the internal gear 3 is not integral with the intermediate bracket 4. However, the internal gear 3 and the intermediate bracket 4 may be formed as one unit of resin. Furthermore, in the above-described embodiment, the internal gear 3 is fitted inside the front bracket 6. However, the technical concept of the invention may be applied to the case where the internal gear 3 is fitted inside the yoke 2 forming the casing, or inside both the yoke 2 and the front bracket 6. In addition, in the above-described embodiment, the ring 22 is made of iron. However, it goes without saying that the ring 22 may be made of other metals.

As was described above, according to the invention, the internal gear of resin is provided inside the casing or an additional metal ring fitted in the casing with a predetermined gap therebetween in the radial direction so as to absorb the predetermined shock. Therefore, when the ordinary shock is given to the internal gear, the internal gear is effectively flexed to absorb the shock. When a shock greater than the ordinary shock is applied to the internal gear, the excessive deformation of the internal gear is prevented. That is, the difficulty that the internal gear is broken by a shock is prevented. Thus, the planet gear type speed reduction starter provided by the invention offers high reliability.

What is claimed is:

1. A planetary gear speed reduction system, comprising:
    a casing;
    a planetary gear system within said casing comprising an input shaft, a planet gear coupled to an output shaft and gear-engaged to said input shaft and an internal gear gear-engaged to said planet gear; and
    an axially symmetric metal ring fitted in said casing;
    wherein said internal gear comprises a resin assembly integral with teeth thereof, is always axially held on both axial ends thereof by said casing, radially faces an inside of said casing across a predetermined gap, and is separated from said metal ring by said predetermined gap, whereby said internal gear elastically absorbs a shock in a predetermined range.

2. A planetary gear reduction system as recited in claim 1, wherein said metal ring is fitted in an internal annular groove of said casing.

3. A planetary gear reduction system as recited in claim 2, further comprising a starter motor mechanically coupled to said input shaft and said output shaft is couplable to an engine.

4. A planetary gear reduction system as recited in claim 1, wherein said casing includes a first member and a second member abutting opposing ones of said axial ends of said internal gear.

5. A planetary gear speed reduction system, comprising:
    a casing;
    a planetary gear system within said casing comprising an input shaft, a planet gear coupled to an output shaft and gear-engaged to said input shaft and an internal gear gear-engaged to said planet gear; and
    an axially symmetric metal ring fitted in said casing;
    wherein said internal gear comprises a resin assembly integral with teeth thereof, is always axially and circumferentially held on both axial ends thereof by said casing, radially faces an inside of said casing across a predetermined gap, and is separated from said metal ring by said predetermined gap, whereby said internal gear elastically absorbs a shock in a predetermined range.

6. A planetary gear reduction system as recited in claim 5, wherein said metal ring is fitted in an internal annular groove of said casing.

7. A planetary gear reduction system as recited in claim 6, further comprising a starter motor mechanically coupled to said input shaft and said output shaft is couplable to an engine.

8. A planetary gear reduction system as recited in claim 5, wherein said casing includes a first member and a second member abutting opposing ones of said axial ends of said internal gear.

* * * * *